F. H. CHILDS.
NON-SKID ARMOR.
APPLICATION FILED JULY 5, 1917.
1,243,653.
Patented Oct. 16, 1917.
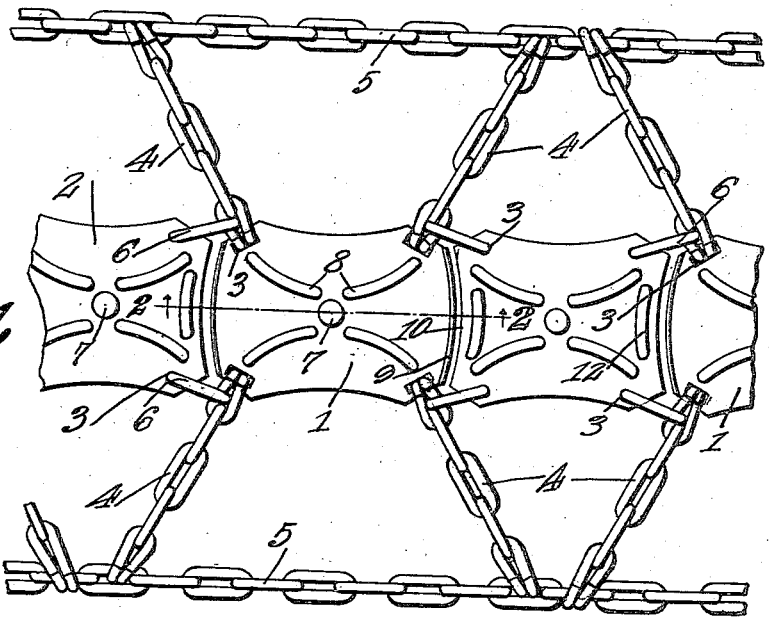
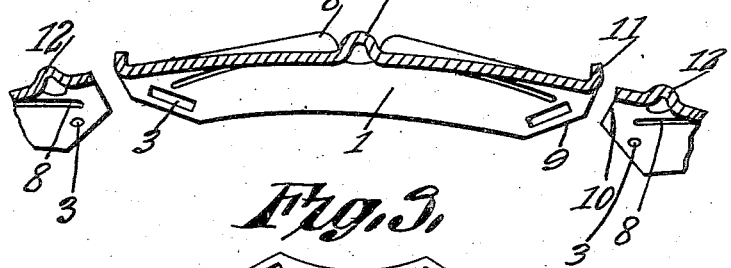
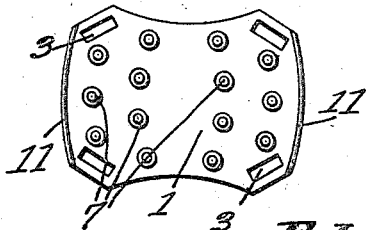
F. H. Childs
Inventor
by Cashrow & Co.
Attorneys

UNITED STATES PATENT OFFICE.

FRANK H. CHILDS, OF STROUD, OKLAHOMA.

NON-SKID ARMOR.

1,243,653.

Specification of Letters Patent. Patented Oct. 16, 1917.

Application filed July 5, 1917. Serial No. 178,620.

*To all whom it may concern:*

Be it known that I, FRANK H. CHILDS, a citizen of the United States, residing at Stroud, in the county of Lincoln and State of Oklahoma, have invented a new and useful Non-Skid Armor, of which the following is a specification.

The present invention appertains to non-skid devices for automobile and other vehicle tires, and it is the object of the invention to provide a non-skid armor of novel and improved construction, which can be cheaply manufactured, and which will efficiently serve its intended purpose of preventing punctures and facilitating traction.

It is the object of the invention to provide an armor composed of shoes of novel construction, and assembled in a novel manner.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is a fragmental plan view of a portion of the armor.

Fig. 2 is a sectional view on the line 2—2 of Fig. 1.

Fig. 3 is a plan view of a modified form of shoe.

The armor embodies the series of alternate shoes 1 and 2 stamped from suitable sheet metal, and disposed end to end, said shoes being curved to fit the tread of the tire. The shoes are provided at their four corners with apertures or slots 3, and short diverging chains 4 are engaged with the apertures 3 of the shoes 1 and their remote ends are engaged with side retaining chains 5, which serve to hold the shoes on the tread of the tire. The oblique chains 4 effectively hold the shoes 1 in place, and links 6 engaged with the apertures 3 of the shoes 2 are engaged with those links of the chains 4 which are engaged with the shoes 1, whereby the shoes 2 will be held in place between the shoes 1. The shoes 2 can in some cases be left off when they are not desired. The shoes 2 in being connected by the links 6 with the chains 4 are not only connected thereby with the retaining chains 5, but said shoes 2 and links 6 also serve to couple the shoes 1 together, permitting only slight flexible movements therebetween.

Each of the shoes 1 and 2 is provided with a central out-struck stud 7 and with out-struck curved ribs 8 diverging from the stud to the corners of the shoes, and providing means for obtaining a grip on the road, to prevent skidding. As shown in Fig. 3, the shoe 1 is provided with out-struck apertured studs or spurs 7' instead of the stud 7 and ribs 8.

The ends of the shoes 1 are convexed, as at 9, while the ends of the shoes 2 are concaved, as at 10, to accommodate the ends of the shoes 1, whereby the shoes can fit together end to end snugly, which assists in preventing the lateral displacement of the shoes relatively. The ends of the shoes have out-turned arcuate flanges 11 to assist in holding the shoes in place end to end, and to also engage the ground to facilitate traction. The shoes 2 have out-struck transverse ribs 12 adjacent to their ends.

Having thus described the invention, what is claimed as new is:

1. A non-skid armor embodying a series of shoes, side retaining chains, diverging chains connected to alternate shoes and at their remote ends with the retaining chains, and links connecting the other shoes with those links of the diverging chains which engage the aforesaid shoes.

2. A non-skid armor embodying shoes, side retaining chains, diverging chains connected to the corners of said shoes and at their remote ends with the retaining chains, shoes between the aforesaid shoes, the ends of the shoes being shaped to fit together, and links connecting the corners of the second mentioned shoes with those links of the diverging chains which engage the first mentioned shoes.

In testimony that I claim the foregoing as my own, I have hereto affixed my signature in the presence of two witnesses.

FRANK H. CHILDS.

Witnesses:
W. G. PARDOE,
AMOS A. DEATON.